United States Patent
Lee et al.

(10) Patent No.: US 8,580,444 B2
(45) Date of Patent: Nov. 12, 2013

(54) HYDROGEN DISCHARGE SYSTEM FOR FUEL CELL SYSTEM

(75) Inventors: Hyun Joon Lee, Gyeonggi-do (KR); Yong Gyu Noh, Gyeonggi-do (KR); Bu Kil Kwon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 639 days.

(21) Appl. No.: 12/229,173

(22) Filed: Aug. 19, 2008

(65) Prior Publication Data

US 2009/0233133 A1     Sep. 17, 2009

(30) Foreign Application Priority Data

Mar. 14, 2008  (KR) .................. 10-2008-0023609

(51) Int. Cl.
*H01M 8/06*   (2006.01)

(52) U.S. Cl.
USPC ............ 429/415; 429/408; 429/413; 429/414

(58) Field of Classification Search
USPC ........................ 429/25, 408, 413, 414, 415
See application file for complete search history.

(56) References Cited

U.S. PATENT DOCUMENTS

| | | | |
|---|---|---|---|
| 2002/0094469 A1* | 7/2002 | Yoshizumi et al. | 429/34 |
| 2005/0118471 A1 | 6/2005 | Fukuma et al. | |
| 2006/0068250 A1* | 3/2006 | Bai et al. | 429/26 |
| 2007/0065696 A1* | 3/2007 | Fukuma et al. | 429/26 |
| 2007/0207356 A1* | 9/2007 | Miyata et al. | 429/26 |
| 2008/0113228 A1* | 5/2008 | Whyatt et al. | 429/13 |

FOREIGN PATENT DOCUMENTS

| | | |
|---|---|---|
| JP | 63-259972 | 10/1988 |
| JP | 2002134142 A  * | 5/2002 |
| JP | 2003-056800 | 2/2003 |
| JP | 2005-209427 | 8/2005 |
| JP | 2007-115543 | 5/2007 |
| KR | 10-2008-0008119 | 1/2008 |

OTHER PUBLICATIONS

Lio, Masatoshi, Machine translation of JP 2002134142 A, May 2002.*

* cited by examiner

*Primary Examiner* — Sean P Cullen
(74) *Attorney, Agent, or Firm* — Edwards Wildman Palmer LLP; Peter F. Corless

(57) ABSTRACT

The present invention provides a hydrogen discharge system for a fuel cell system, which can ensure safety of a fuel cell vehicle by optimizing the dilution of hydrogen discharged from a fuel cell during discharge and ensure silence of the vehicle by reducing noise generated during discharge.

For this purpose, the present invention provides a hydrogen discharge system for a fuel cell system including a purge valve for purging hydrogen discharged from a fuel electrode of a fuel cell stack, the hydrogen discharge system including: an ejector mounted to a hydrogen purge line extending from the purge valve to introduce air from the outside; and a post-treatment system connected to an exhaust line of the ejector to remove hydrogen discharged therethrough.

4 Claims, 5 Drawing Sheets

HYDROGEN DISCHARGE SYSTEM FOR FUEL CELL SYSTEM

CROSS-REFERENCE TO RELATED APPLICATION

This application claims under 35 U.S.C. §119(a) the benefit of Korean Patent Application No. 10-2008-0023609 filed Mar. 14, 2008, the entire contents of which are incorporated herein by reference.

BACKGROUND (a) Technical Field

The present invention relates to a hydrogen discharge system for a fuel cell system. More particularly, the present invention relates to a hydrogen discharge system for a fuel cell system, which can ensure safety of a fuel cell vehicle by optimizing the dilution of hydrogen discharged from a fuel cell during discharge and ensure silence of the vehicle by reducing noise generated during discharge.

(b) Background Art

A fuel cell system can generally comprise a fuel cell stack for generating electricity, a fuel supply system for supplying fuel (hydrogen) to the fuel cell stack, an air supply system for supplying oxygen in the air as an oxidant required for an electrochemical reaction to the fuel cell stack, and a thermal management system for controlling the operation temperature of the fuel cell stack.

In exemplary fuel cell systems having the above configuration, a hydrogen recirculation blower is preferably connected to a hydrogen outlet of the fuel cell stack to recirculate hydrogen remaining after a reaction at a fuel electrode (anode) of the fuel cell stack to the fuel electrode to be reused.

Nitrogen or water accumulated in the fuel electrode is discharged from the fuel cell stack through a periodic purge.

Accordingly, in the operation of the fuel cell stack applied to a fuel cell vehicle, nitrogen or water accumulates in the fuel electrode (hydrogen electrode) and deteriorates the performance of the fuel cell stack, and thus it is necessary to ensure stable performance of the fuel cell stack through the periodic purge of the hydrogen electrode.

When the nitrogen or water is discharged from the fuel cell stack through the periodic purge, some residual hydrogen is discharged together with the nitrogen or water and, if the concentration of the discharged hydrogen is high, there may be a risk of explosion.

Accordingly, the concentration of the discharged hydrogen should be reduced or diluted within the range of explosion in order to avoid explosion.

For this purpose, conventionally, a diluter is provided in a hydrogen purge line to dilute the concentration of hydrogen in the air.

However, in the case where the diluter is used for example, hydrogen and air are merely mixed with each other, but the absolute amount of hydrogen is not reduced. Accordingly, the hydrogen may be accumulated in the inside of the vehicle and may cause safety accidents. A pipe channel for introducing air into the diluter or an air supply device may be provided, which increases the manufacturing cost and results in complexity of the piping.

As a post-treatment system for treating hydrogen discharged from the fuel cell stack, there has been conventionally proposed a catalyst combustion device or a flame combustion device, in which a large amount of air is introduced into a reactor to remove exhaust hydrogen discharged from the fuel cell stack. However, it results in complexity of the piping and increases the load of an air blower for supplying air to the catalyst combustion or flame combustion device.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention is directed to a hydrogen discharge system for a fuel cell system, in which an ejector for introducing air is preferably connected to a hydrogen purge line and a post-treatment system, such as a humidifier, a catalyst combustion reactor, and a burner, is provided at an outlet port of the ejector so as to remove a significant amount of hydrogen and, at the same time, to improve humidification of a fuel cell stack, thus improving the performance and durability of the fuel cell stack.

In one embodiment, the present invention provides a hydrogen discharge system for a fuel cell system including a purge valve for purging hydrogen discharged from a fuel electrode of a fuel cell stack, the hydrogen discharge system suitably comprising an ejector mounted to a hydrogen purge line extending from the purge valve to introduce air from the outside; and a post-treatment system preferably connected to an exhaust line of the ejector to remove hydrogen discharged therefrom.

In a preferred embodiment, the post-treatment system is a humidifier for supplying humidified air to an air electrode of the fuel cell stack, and the exhaust line of the ejector is preferably connected to the inside of the humidifier.

In another preferred embodiment, the post-treatment system is a catalyst combustion device suitably mounted to the exhaust line of the ejector, and an exhaust line of the catalyst combustion device extends to the outside or is connected to the inside of the humidifier.

In still another preferred embodiment, the post-treatment system is a burner mounted to the exhaust line of the ejector, and an exhaust line of the burner extends to the outside or is connected to the inside of the humidifier.

In yet another preferred embodiment, a branch line having an air supply valve is preferably connected between an air exhaust line extending from the air electrode of the fuel cell stack and the exhaust line of the ejector.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated in the accompanying drawings which are given hereinafter by way of illustration only, and thus are not limitative of the present invention, and wherein.

Figure 1:
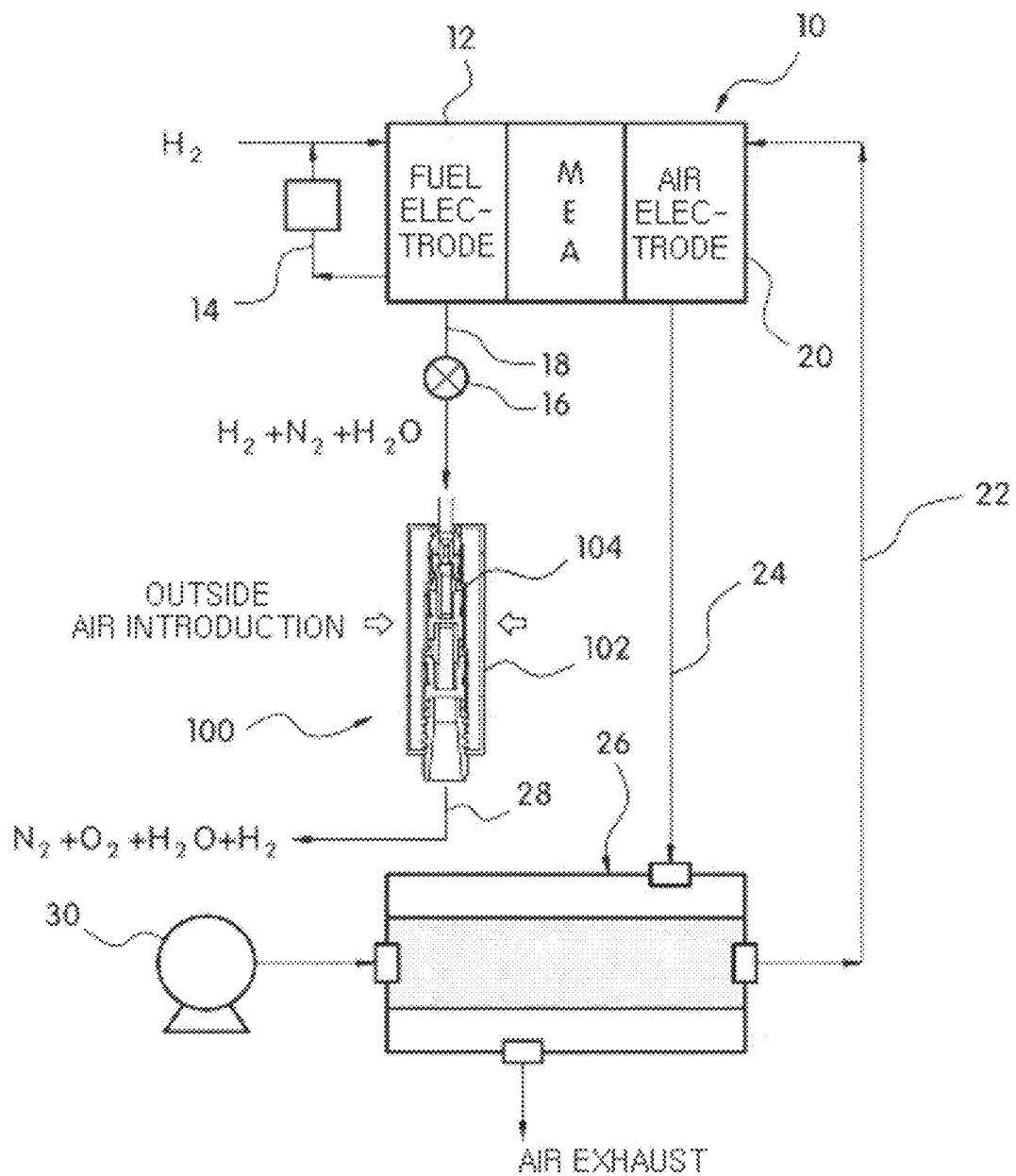
FIG. 1 is a schematic diagram showing an exemplary hydrogen discharge system for a fuel cell system in accordance with a first embodiment of the present invention.

Reference numerals set forth in the Drawings includes reference to the following elements as further discussed below:

| | |
|---|---|
| 10: fuel cell stack | 12: fuel electrode |
| 14: hydrogen recirculation line | 16: purge valve |
| 18: hydrogen purge line | 20: air electrode |
| 22: air supply line | 24: air exhaust line |
| 26: humidifier | 28: exhaust line of ejector |
| 30: blower | 32: catalyst combustion device |
| 34: exhaust line of catalyst combustion device | |
| 36: burner | 38: exhaust line of burner |
| 40: branch line | 42: air supply valve |
| 100: ejector | 102: housing |
| 104: ejector main body | 106: main inlet |
| 110a, 110b and 110c: nozzles | 112a, 112b and 112c: sub-inlets |
| 114: cover body | 116: check valve |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

As described herein, the present invention includes a hydrogen discharge system for a fuel cell system including a purge valve for purging hydrogen discharged from a fuel electrode of a fuel cell stack, the hydrogen discharge system comprising an ejector mounted to a hydrogen purge line and a post-treatment system. In certain preferred embodiments, the ejector mounted to the hydrogen purge line extends from the purge valve to introduce air from the outside and the post-treatment system is connected to an exhaust line of the ejector to remove hydrogen discharged therefrom. In other preferred embodiments, the post-treatment system is a humidifier for supplying humidified air to an air electrode of the fuel cell stack, and the exhaust line of the ejector is connected to the inside of the humidifier. In still other embodiments, the post-treatment system further comprises a catalyst combustion device mounted to the exhaust line of the ejector, and an exhaust line of the catalyst combustion device extends to the outside or is connected to the inside of the humidifier. In exemplary embodiments, the post-treatment system further comprises a burner mounted to the exhaust line of the ejector, and an exhaust line of the burner extends to the outside or is connected to the inside of the humidifier. In other further embodiments, a branch line having an air supply valve is connected between an air exhaust line extending from the air electrode of the fuel cell stack and the exhaust line of the ejector.

The invention can also include a motor vehicle comprising a hydrogen discharge system according to any of the embodiments as described herein.

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

The present invention is directed to removing hydrogen by connecting an ejector to a hydrogen purge line (a pipe for discharging hydrogen) of a fuel cell stack and, at the same time, enabling removal, in certain examples complete removal, of hydrogen by suitably introducing the hydrogen into an inlet port of an air electrode of the fuel cell stack, or repeatedly diluting a small amount of hydrogen by suitably introducing the hydrogen into an outlet port of an air electrode of the fuel cell stack. Preferably, water produced by catalyst combustion is suitably introduced into the air electrode to suitably improve the humidification of the fuel cell stack.

First Embodiment

FIG. 1 is a schematic diagram showing a preferred hydrogen discharge system for a fuel cell system in accordance with a first exemplary embodiment of the present invention.

As shown in the figure, a hydrogen recirculation line 14 and a hydrogen purge line 18 including a purge valve 16 are suitably connected to a fuel electrode 12 of a fuel cell stack 10. Preferably, an air supply line 22 and an air exhaust line 24 are suitably connected to an air electrode 20 of the fuel cell stack 10, and a humidifier 26 for supplying humidified air to the air electrode 20 is suitably connected thereto.

In preferred embodiments, an ejector 100 for introducing air from the outside is connected to the hydrogen purge line 18 extending from the purge valve 16, and an exhaust line 28 of the ejector 100 suitably extends to the outside as it is.

According to exemplary embodiments, the purge valve 16 is preferably an ON/OFF valve and serves to discharge nitrogen, or any other by-products that are contained in exhaust gas discharged from an outlet of the fuel cell stack 10, to the outside in order to maintain optimal properties of recirculated gas. Accordingly, during purge, nitrogen, hydrogen, water vapor, water, and other by-products are discharged through the purge valve 16, and the number of times of ON/OFF and the opening time are suitably controlled according to the load.

Any kind of ejector capable of sucking air may be used as the ejector 100. According to certain embodiments, it is preferable to use a multi-stage in-line cartridge ejector suitably comprising a housing 102 and an ejector main body 104.

Figure 5:
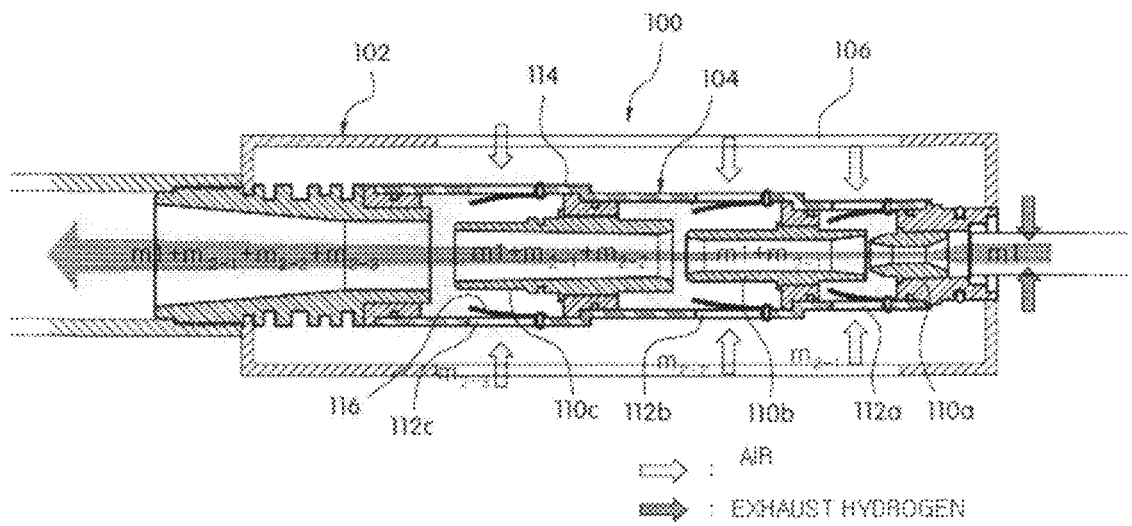
FIG. 5 is a cross-sectional view illustrating an operation principle of an ejector applied to the hydrogen discharge system for a fuel cell system in accordance with the present invention.

An exemplary structure of the ejector 100 is described with reference to FIG. 5 below.

In exemplary embodiments, the ejector main body 104 is suitably fixedly mounted in the housing 102 having a main inlet 106, and preferably at least three nozzles 110a, 110b, and 110c that are sequentially arranged with a predetermined gap in the ejector main body 104. In certain embodiments, the respective nozzles 110a, 110b, and 110c have diameters which suitably become progressively larger from the inlet port to the outlet port in the order of arrangement.

In exemplary embodiments, a cover body 114 suitably having at least three sub-inlets 112a, 112b, and 112c is provided on the outer circumference of the respective nozzles 110a, 110b, and 110c such that the respective nozzles 110a, 110b, and 110c are suitably fixed. In further exemplary embodiments, the three sub-inlets 112a, 112b, and 112c are preferably connected to gap spaces between the respective nozzles 110a, 110b, and 110c.

Preferably, a check valve 116 is mounted on the three sub-inlets 112a, 112b, and 112c to suitably prevent the introduced air from leaking to the outside.

An example of the operation of the hydrogen discharge system in accordance with the first embodiment of the present invention is described below.

In an exemplary embodiment, when the hydrogen discharged through the hydrogen purge line 18 is introduced into the ejector 100, the respective nozzles 110a, 110b, and 110c of the ejector main body 104 suitably perform an amplification operation that continuously increases the flux of introduced hydrogen while in other preferred embodiments at the same time, outside air is suitably introduced into the ejector main body 104 and mixed with the exhaust hydrogen, thus suitably providing hydrogen dilution.

The operation principle of the ejector for providing the hydrogen dilution is described in more detail in the example below.

(1) Exhaust hydrogen discharged from the hydrogen purge line 18 of the fuel cell stack 10 can be injected through the first-stage nozzle 110a.

(2) The injected hydrogen from the first-stage nozzle 110a preferably creates a vacuum pressure (low pressure) in the first-stage nozzle portion, and the check valve 116 is opened by the vacuum pressure to suitably introduce outside air through the first-stage sub-inlet 112a.

(3) While the introduced outside air is mixed with hydrogen, the gas density is preferably increased, and thereby a higher vacuum pressure is created in the second-stage nozzle 110b.

(4) The mixed gas is preferably reinjected through the second-stage nozzle 110b to create a low pressure in the second stage, and thereby the corresponding check valve 116 is opened to introduce outside air through the second-stage sub-inlet 112b.

(5) By the above principle, a suitably higher vacuum pressure is created in the third stage by the third-stage nozzle 110c, and accordingly outside air is introduced into the third-stage sub-inlet 112c.

(6) According to certain embodiments of the invention, the above processes (1) to (5) are repeated in the respective steps, and the more the stages, the more the amount of introduced air is preferably increased.

As set forth in the examples above, since at least one ejector 100 is preferably connected to the hydrogen purge line 18 of the fuel cell stack 10, the exhaust hydrogen is suitably mixed with outside air, and thus the dilution of the exhaust hydrogen is facilitated. The diluted hydrogen is discharged to the outside through the exhaust line 28 of the ejector 100.

In certain embodiments, since the dilution operation of the exhaust hydrogen is preferably spontaneously performed by the spontaneous introduction of air through the ejector, the present invention provides advantages in that it is easy to control the amount of air supply based on the selection of ejectors, and in certain embodiments of the invention, separate control logic is not required, and it is easy to prevent excessive rise of temperature by controlling the amount of outside air.

Second Embodiment

Figure 2:
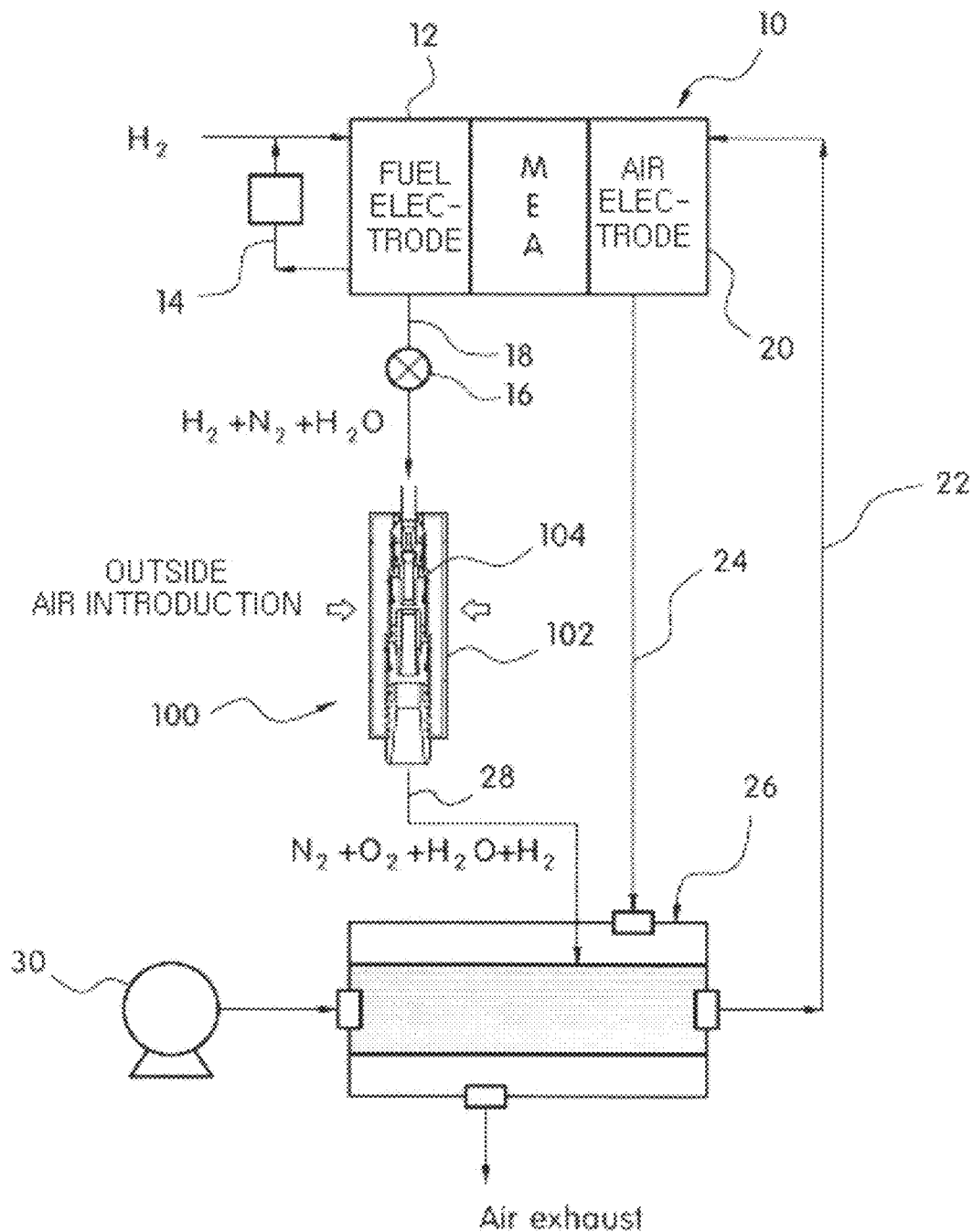
FIG. 2 is a schematic diagram showing an exemplary hydrogen discharge system for a fuel cell system in accordance with a second embodiment of the present invention.

FIG. 2 is a schematic diagram showing an exemplary hydrogen discharge system for a fuel cell system in accordance with a second embodiment of the present invention.

As shown in the figure, a second embodiment of the present invention features an exhaust line 28 of the ejector 100 that does not extend to the outside, but is preferably connected to the humidifier 26 for supplying humidified air to the air electrode 20.

In preferred embodiments, the diluted gas, i.e., the air and exhaust hydrogen, discharged through the exhaust line 28 of the ejector 100 is not exhausted to the outside but is suitably introduced into the humidifier 26.

For example, when the diluted gas is not discharged to the outside but is introduced into the humidifier 26, the humidifier 26 can preferably serve as a buffer tank, i.e., a silencer, and at the same time may preferably serve as a diluter for diluting a large amount of air and hydrogen.

According to preferred embodiments, since water is contained in the exhaust hydrogen, the exhaust hydrogen suitably introduced into the humidifier 26 becomes a humidification source for the air supplied to the fuel cell, and surplus air preferably becomes an additional supply source of oxygen, a reactant of the fuel cell.

Thus, in preferred embodiments, the water contained in the exhaust hydrogen may serve to suitably humidify outside air introduced by a blower 30, and the surplus air is mixed with the outside air introduced by the blower 30 to become an additional supply source of oxygen supplied to the air electrode 20.

Third Embodiment

Figure 3:
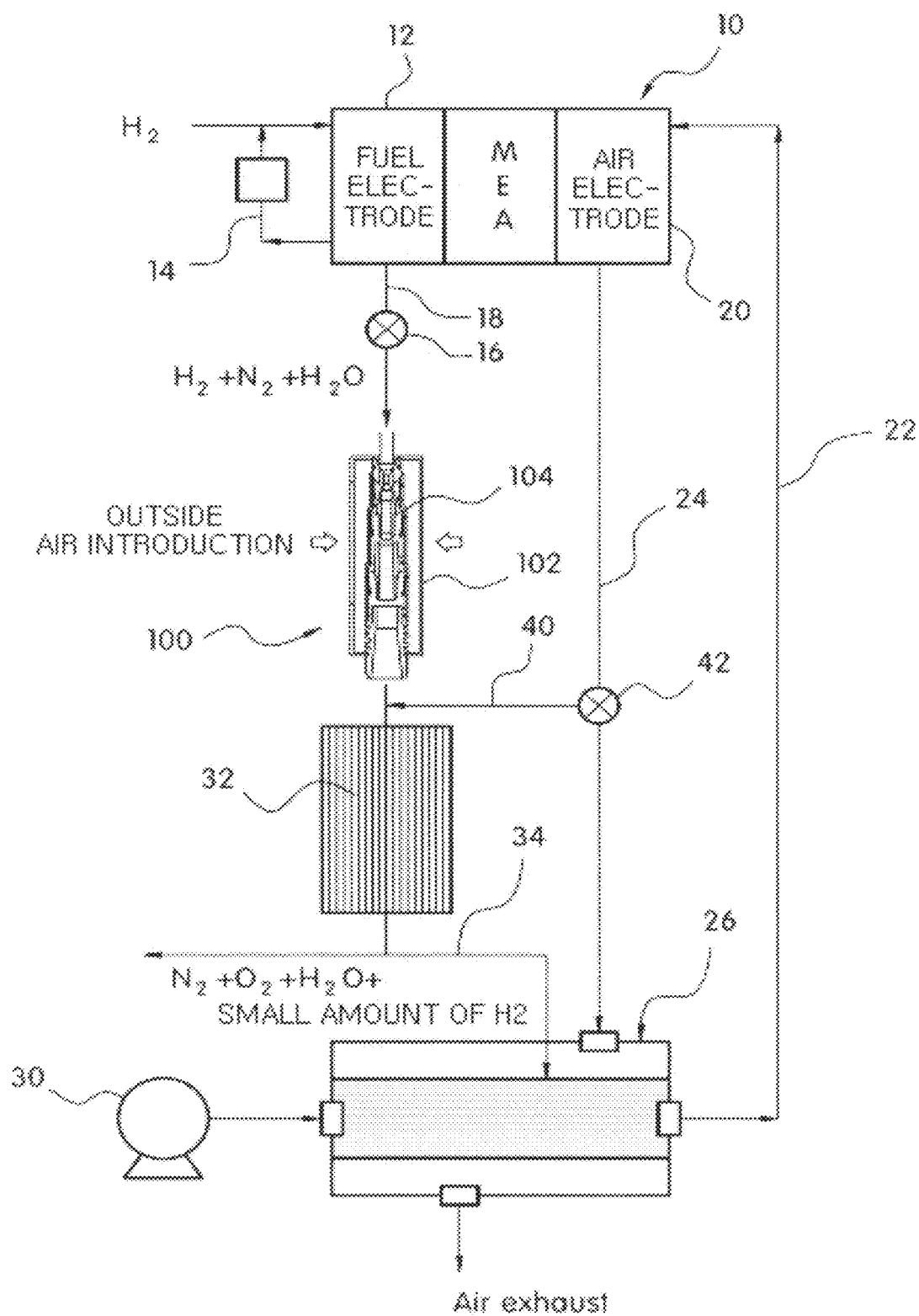
FIG. 3 is a schematic diagram showing an exemplary hydrogen discharge system for a fuel cell system in accordance with a third embodiment of the present invention.

FIG. 3 is a schematic diagram showing an exemplary hydrogen discharge system for a fuel cell system in accordance with a third embodiment of the present invention.

As shown in the figure, the third the second embodiments of the present invention exemplify features of the invention comprising a catalyst combustion device 32 as a post-treatment system that is connected to the exhaust line 28 of the ejector 100.

In exemplary embodiments, an exhaust line 34 of the catalyst combustion device 32 extends to the outside or is connected to the inside of the humidifier 26.

According to certain embodiments, when the hydrogen discharged from the fuel cell stack 10 passes through the ejector 100 to be mixed with air and is introduced into the catalyst combustion device 32, the hydrogen can preferably be easily removed by a catalyst combustion reaction.

In exemplary embodiments, a catalyst combustion reactor in the catalyst combustion device 32 acts as a buffer preferably to remove noise generated during introduction of exhaust hydrogen.

In preferred embodiments, the air exhaust line 24 extending from the air electrode 20 of the fuel cell stack 10 and the exhaust line 28 of the ejector 100 are suitably connected to a branch line 40 having an air supply valve 42.

Accordingly, in certain exemplary embodiments, when a controller (not shown) opens the air supply valve 42 at the very time when the purge valve 16 is opened, the air discharged from the air electrode 20 of the fuel cell stack 10 may be additionally supplied to the catalyst combustion reactor in the catalyst combustion device 32 through the branch line 40 in order to ensure a sufficient amount of air suitably required to remove the hydrogen by the catalyst combustion reaction.

In certain examples, after the hydrogen is removed by the catalyst combustion device 32, a small amount of hydrogen and water may remain and is supplied to the humidifier 26.

Accordingly, the water produced during the catalyst combustion reaction is introduced into the humidifier 26 to act as an additional humidification source for the air supplied to the fuel cell stack 10 by the air blower 30, and the small amount of residual hydrogen is substantially or completely diluted with the air in the humidifier 26 and suitably discharged to the outside through an exhaust line of the humidifier 26.

Fourth Embodiment

Figure 4:
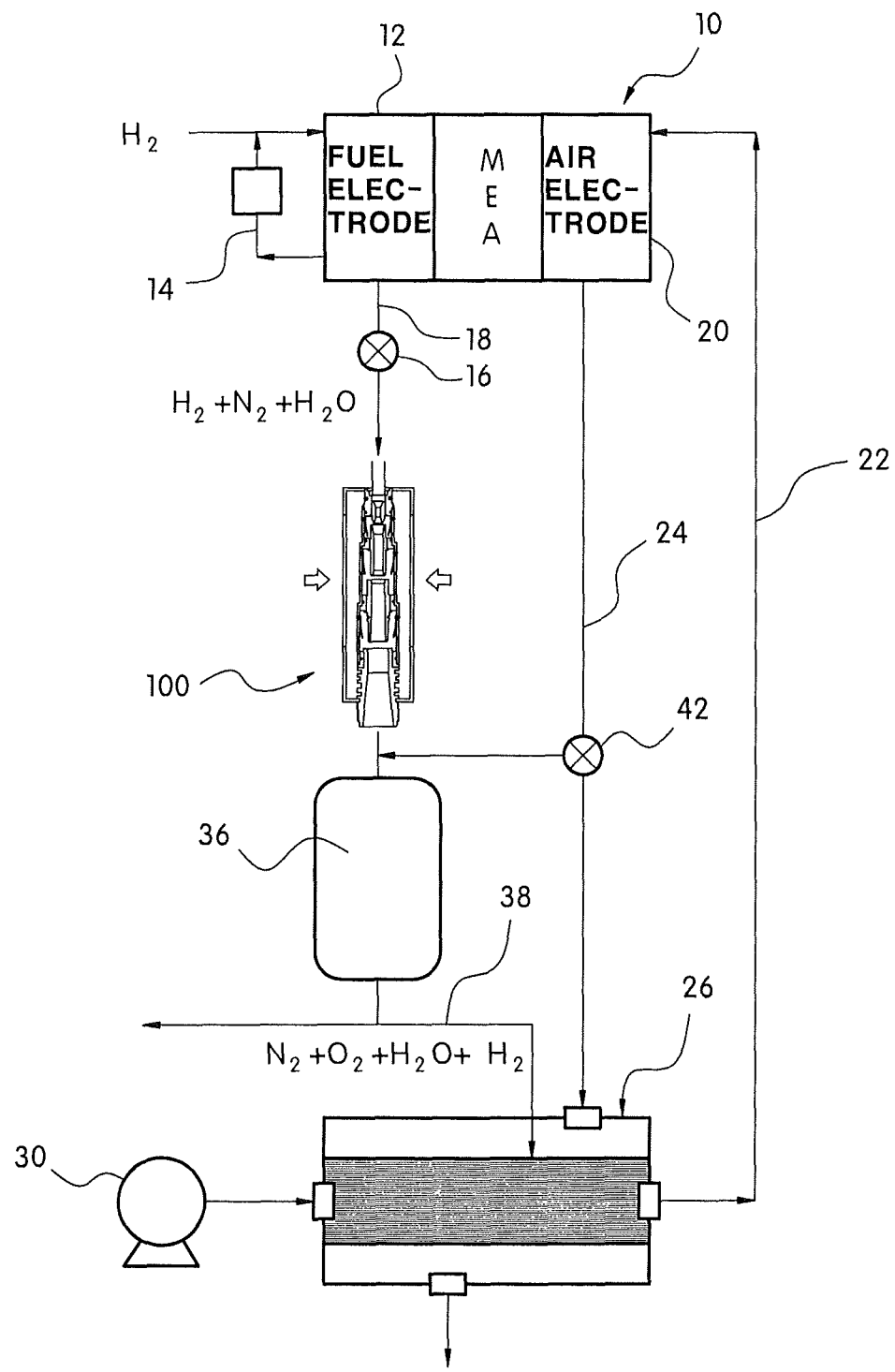
FIG. 4 is a schematic diagram showing an exemplary hydrogen discharge system for a fuel cell system in accordance with a fourth embodiment of the present invention.

FIG. 4 is a schematic diagram showing an exemplary hydrogen discharge system for a fuel cell system in accordance with a fourth embodiment of the present invention.

As shown in the figure, the fourth the second embodiment of the present invention have certain preferred features in that a burner 36 as a post-treatment system is preferably connected to the exhaust line 28 of the ejector 100.

In certain embodiments, an exhaust line 38 of the burner 36 extends to the outside or is connected to the inside of the humidifier 26.

Accordingly, when the hydrogen discharged from the fuel cell stack 10 passes through the ejector 100 to be mixed with air and is suitably introduced into the burner 36, the hydrogen can be easily removed by combustion in the burner 36.

In the same manner, the air exhaust line 24 extending from the air electrode 20 of the fuel cell stack 10 and the exhaust line 28 of the ejector 100 are suitably connected to a branch line 40 having an air supply valve 42.

Accordingly, in exemplary embodiments, when a controller (not shown) opens the air supply valve 42 at the very time when the purge valve 16 is opened, the air discharged from the air electrode 20 of the fuel cell stack 10 may preferably be additionally supplied to a combustion chamber in the burner 36 through the branch line 40 in order to suitably ensure a more sufficient amount of air required to remove the hydrogen by a combustion reaction.

In certain embodiments, even after the hydrogen is removed by the burner 36, a small amount of hydrogen and water remains and is supplied to the humidifier 26.

As a result, in certain cases, the water produced during the combustion reaction of the burner 36 is preferably introduced into the humidifier 26 to act as an additional humidification source for the air supplied to the fuel cell stack 10 by the air blower 30, and the small amount of residual hydrogen is substantially or completely diluted with the air in the humidifier 26 and discharged to the outside through an exhaust line of the humidifier 26.

As described above, the present invention provides the following effects.

In certain embodiments, the ejector is preferably connected to the hydrogen purge line of the fuel cell stack and the post-treatment system, such as the catalyst combustion device, burner, and humidifier, is preferably provided at the outlet port of the ejector, it is possible to dilute the hydrogen discharged from the fuel cell stack and, at the same time, readily to remove the exhaust hydrogen.

In other certain embodiments, the final hydrogen exhaust line is preferably connected to the inside of the humidifier such that the water contained in the exhaust hydrogen is introduced into the humidifier, it is possible to efficiently humidify the air supplied to air electrode.

According to preferred embodiments, since the final hydrogen exhaust line is suitably connected to the inside of the humidifier, the humidifier may act as a buffer, i.e., a silencer.

In other preferred embodiments, since the ejector is connected to the hydrogen purge line (pipe for discharging hydrogen) of the fuel cell stack, outside air is spontaneously introduced thereinto, and thus a pipe channel for supplying air for dilution and an air supply device are not required.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A hydrogen discharge system for a fuel cell system including a purge valve for purging hydrogen discharged from a fuel electrode of a fuel cell stack, the hydrogen discharge system comprising:
    an ejector mounted to a hydrogen purge line extending from the purge valve to introduce air from the outside, the ejector being capable of intaking air by itself; and
    a post-treatment system connected to an exhaust line of the ejector to remove hydrogen discharged therefrom,
    wherein a controller programmed to open an air supply valve at the time when a purge valve is opened, air discharged from an air electrode of the fuel cell stack is supplied to a catalyst combustion reactor in a catalyst combustion device through a branch line to ensure a sufficient amount of air suitably required to remove the hydrogen by catalyst combustion reaction.

2. The hydrogen discharge system of claim 1, wherein the post-treatment system is a humidifier for supplying humidified air to the air electrode of the fuel cell stack, and the exhaust line of the ejector is connected to the inside of the humidifier.

3. The hydrogen discharge system of claim 1, wherein the post-treatment system comprises the catalyst combustion device mounted to the exhaust line of the ejector, and an exhaust line of the catalyst combustion device that extends to the outside or is connected to the inside of the humidifier.

4. The hydrogen discharge system of claim 1, wherein the air supply valve is disposed within the branch line between an air exhaust line extending from the air electrode of the fuel cell stack and the exhaust line of the ejector.

* * * * *